(12) United States Patent
Joshi et al.

(10) Patent No.: US 7,783,927 B2
(45) Date of Patent: Aug. 24, 2010

(54) INTELLIGENT PROCESSING TOOLS

(75) Inventors: Komal Joshi, Rajasthan (IN); Tanuj Vohra, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 11/684,309

(22) Filed: Mar. 9, 2007

(65) Prior Publication Data

US 2008/0222610 A1 Sep. 11, 2008

(51) Int. Cl.
*G06F 11/00* (2006.01)
(52) U.S. Cl. ......................... 714/38; 714/124
(58) Field of Classification Search ............... 714/38; 717/124, 125
See application file for complete search history.

(56) References Cited

U.S. PATENT DOCUMENTS

| | | | | |
|---|---|---|---|---|
| 5,157,782 A * | 10/1992 | Tuttle et al. | ............. | 714/45 |
| 5,335,342 A | 8/1994 | Pope et al. | | |
| 5,475,843 A | 12/1995 | Halviatti et al. | | |
| 5,758,062 A * | 5/1998 | McMahon et al. | ............. | 714/38 |
| 6,259,969 B1 | 7/2001 | Tackett et al. | | |
| 6,336,149 B1 * | 1/2002 | Preston | ............. | 710/1 |
| 6,408,403 B1 * | 6/2002 | Rodrigues et al. | ............. | 714/38 |
| 6,460,147 B1 | 10/2002 | Cox | | |
| 7,373,636 B2 * | 5/2008 | Barry et al. | ............. | 717/124 |
| 2004/0153837 A1 * | 8/2004 | Preston et al. | ............. | 714/39 |
| 2005/0204343 A1 * | 9/2005 | Kisamore et al. | ............. | 717/124 |
| 2006/0041864 A1 | 2/2006 | Holloway et al. | | |
| 2007/0220347 A1 * | 9/2007 | Kirtkow et al. | ............. | 714/38 |

OTHER PUBLICATIONS

Larry Smith, Cameron Laird "Android: open-source scripting for testing and automation" Dr. Dobb's Journal, vol. 26 No. 7, p. 99-102 Miller Freeman, Jul. 2001 http://wvvw.ddj.com/184404691.

* cited by examiner

*Primary Examiner*—Philip Guyton
(74) *Attorney, Agent, or Firm*—Hamilton, Brook, Smith & Reynolds, PC

(57) ABSTRACT

A method and system capable of executing software for recording and playback of actions associated with events occurring during execution of the software configured for processing a software, wherein the software comprises a set instructions for performing one or more system requirements and generating an output; recording an event at a first instance and the associated action taken by the user during execution of the software; creating an action map of the event and respective response for the event as recorded by the user; storing the action map and detecting occurrences of an unexpected event at a next instance during execution of the software; associating a respective response from the action map with the unexpected event; and providing the user with an respective response which comprises the action taken.

17 Claims, 2 Drawing Sheets

INTELLIGENT PROCESSING TOOLS

FIELD OF THE INVENTION

This invention relates to the use of software tools, preferably functional testing tools, debugging tools etc., and more particularly to building intelligence and robustness into such tools.

BACKGROUND OF THE INVENTION

Testing is not just about reducing risk, but it is also about increasing control on the software developed. By aligning the testing objectives with the business objectives and by increasing the effectiveness of testing both can be delivered. A challenge with the industry with regards to functional testing tools is using the right testing tool at the right time in a project, which can significantly increase the efficiency of testing by automating processes, increasing communication, promoting best practices and re-use of tests and test data.

For example there are a variety of functional testing tools which are configured with capabilities related to recording or scripting to perform a specific function, and then playback the recording to verify that the functionality that was tested indeed behaves as desired. A disadvantage with such functional testing tools is that unless the recorded/scripted session is identical to the session during the playback, the script fails, even when such errors may occur due to unrelated actions. For example, a function test for a SAP application that could fail while running on a browser because the server is busy and a response is not obtained in time. A further example is an HTML page that has failed to load up the first time, where reloading the page would have typically fixed such an error. Yet a further example is of random message that might pop up when a script is running during playback, of the laptop computer running on low battery, which can cause the script running to fail. These errors typically are not associated with any core functionality of the script or software running on a system, but nonetheless cause the functional script, e.g. a functional test script or a functional debug script etc., to fail.

U.S. Pat. No. 5,475,843 describes a system and method for improved program testing. The system comprises a Computer-based Training system (CBT) having one or more Application Translation Units (ATUs), a Message Engine, and a Script Engine. For one or more target applications of interest, an ATU is provided for processing events specific to that application, thereby trapping events and translating them into abstract messages or "meta-messages" for conveying information about a particular event to the system. The system provides prefabricated building blocks for constructing a high-level model of an application's User Interface (UI). This high-level model serves as a middle ground between test scripts and the application being tested. The knowledge of how a given UI element is controlled or how it can be observed is retained in the model rather than in a test script. Consequently, the test script consists of easy-to-maintain, high-level testing commands only. However a disadvantage being preventing actions to be taken for the same event that appears again in the same test run, because an action for a new event not specified in the script can only be taken after the user has stopped execution and written an action in the script. A further disadvantage is that the system is not configured to record any user actions taken during a playback.

Without a way to improve the method and system to executing software processing tools, the promise of this technology may never be fully achieved.

SUMMARY OF THE INVENTION

Accordingly, the present invention provides a method and a system for recording and playback of actions associated with events occurring during execution of software. The software, for example a test script or debug script, is processed, where the software contains a set instructions for performing one or more of the system requirements and generating an respective output based on the set of instructions that are processed. During execution of the software, recording an event at a first instance and the associated action taken by the user during execution of the software. Once the event and the action are recorded, creating an action map of the event and respective response for the event as recorded by the user and storing the action map. When an unexpected event occurs in a next instance of time, detecting occurrences of an unexpected event during execution of the software. Associating a respective response from the action map with the unexpected event; and providing the user with a respective response which comprises the action taken. In one embodiment, these tasks are accomplished without any human intervention. In a further embodiment, an agent, for example a software agent, on the system may be configured to accomplish these tasks.

An advantage of the system and method of this invention is that user need not stop execution of the software for any actions related to new events not specified in the script thereby allowing actions to be taken for the same event repeating in the script. A further advantage is that user actions are recorded during playback and the system is constantly learning and thereby building intelligence into the system. Yet a further advantage is that any unexpected events can be efficiently handled.

DETAILED DESCRIPTION

Figure 1:
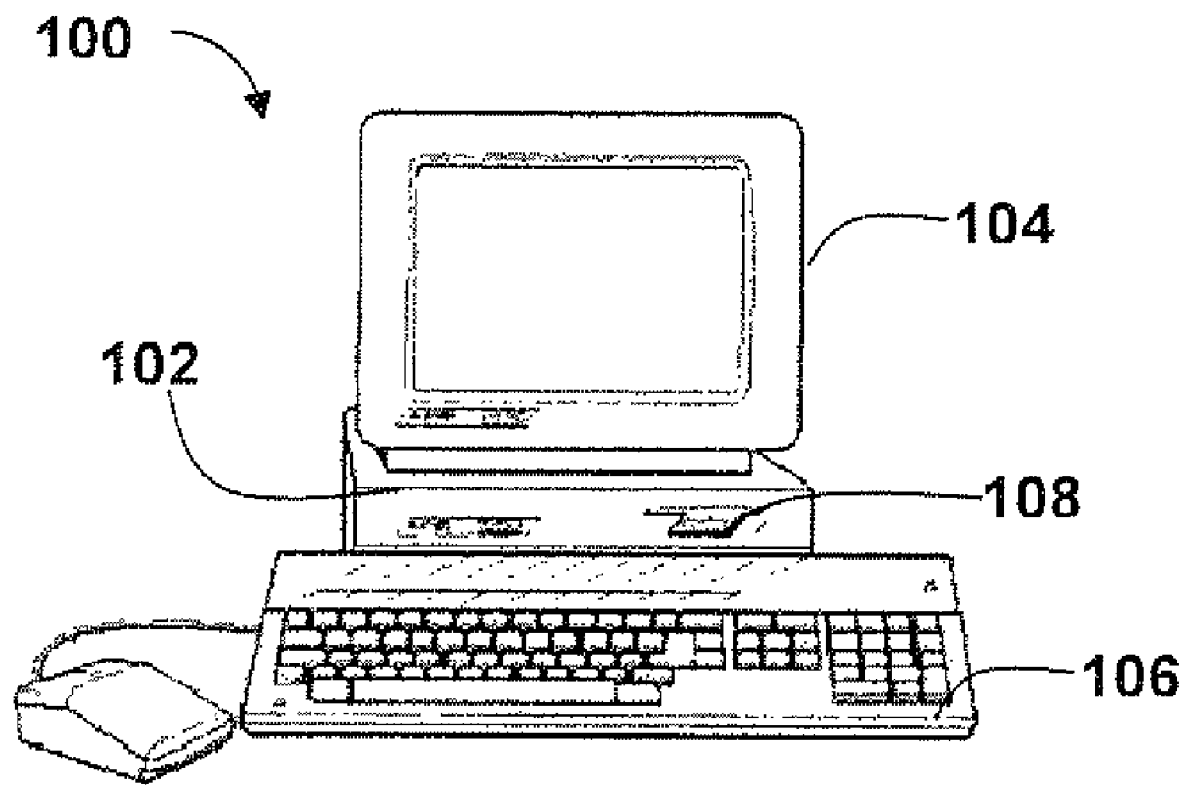
FIG. 1 illustrates an exemplary embodiment of a system 100 capable of recording and playback of actions associated with events occurring during execution of software in accordance with the present invention.

Where reference is made in any one or more of the accompanying drawings to steps and/or features, which have the same reference numerals, those steps and/or features have for the purposes of this description the same function(s) or operation(s), unless the contrary intention appears. The term "software", "program", "code" and "instruction" are used synonymously, and in this invention preferably indicate scripts such as test scripts, debug scripts and the like. Other equivalent expressions to the above expression would be apparent to a person skilled in the art.

The system 100 in FIG. 1, preferably a processing system or a computing system, include and are not limited a variety of electronic devices such as desktop computers, application servers, web servers, database servers and the like and portable electronic devices such as mobile phones, personal digital assistants (PDAs), pocket personal computers, laptop computers, and the like, which are capable of executing software such as scripts involving at least a processor and a memory. It should be apparent to a person skilled in the art that any device, e.g. electronic devices, portable electronic devices, handheld electronic devices and the like, which includes at least a processor and a memory configured execute scripts falls within the scope of the present invention.

FIG. 1 illustrates an exemplary embodiment of a system 100 with at least a processor and a memory in which the present invention may be implemented is depicted in accordance with a one embodiment. The system 100 depicted includes a system unit 102, which further includes essential hardware components such as a microprocessors, memory, connectors, system bus, power unit etc (some of which are not shown in the figure), a video display terminal 104, an input device 106, the input device including a keyboard, mouse, a joystick, touchpad, touch screen, trackball, microphone, etc., and storage devices 108, which may include floppy drives and other types of permanent and removable storage media. Although the depicted representation shows a stand alone system 100, further embodiments of the present invention may be implemented in other types of systems 100, coupled over a network. For example a wired network, wireless network work or a combination thereof. The system 100 also preferably includes a graphical user interface (GUI) that may be implemented by means of systems software residing in computer readable media in operation within the system 100.

The memory associated with any system 100 is typically is an electronic holding place for instructions and/or data accessed, such as a semiconductor device e.g. random access memory (RAM), such that microprocessor of the system 100 can access the instruction and/or data rather quickly. When the computing system is in normal operation, the memory usually contains the main parts of the operating system and some or all of the application programs and related data that are being used by the computing system. Accessing data via the memory is faster than reading from a hard drive, so having a larger RAM makes it quick to retrieve recently accessed files, applications, and other data. Further, all programs must be run through the memory before they can be used. The system unit 102 typically containing these components is used for processing the software, in this case the scripts. The input device 106 is to record the user input and data may be entered via this input device 106 to perform specific functions. The video display terminal 104 is used to display the results to the user, for example the recorded input, the changed input, the associated actions, the responses etc.

In one embodiment, the system 100 comprising at least a processor and a main memory capable of executing software for recording and playback of actions associated with events occurring during execution of the software configured, wherein the software executed is a script as described previously. The software, is loaded on the memory and executed on the processor, where typically the software processed/executed, the software comprises a set instructions for performing one or more system requirements and generating an output in response to the executed set of instruction contained in the script. A user event that occurs at a first instance is recorded and the associated action taken by the user during execution of the software is simultaneously recorded. Based on the recorded event and action an action map is created, which contains for example parameters such as name of event, action taken, response of user etc. The action map created is stored in the form of a lookup table and the lookup table containing the historical data of previously recorded events can be stored in a repository on the system. The repository may be stored for example on a storage medium 108.

During execution of the software, e.g. the script, at a next instance any unexpected events that occur are detected by the system. If any such unexpected events are detected, the system is configured to associate a respective response from the action map already created, which contains previously recorded event, and present the user with an appropriate response which contains the action taken for any such events that has occurred previously and has been recorded.

Associating the respective response from the action map with the unexpected events is performed by typically find a mapping between the unexpected event that has occurred at the next instance with any previously recorded events recorded in the action map, which is the lookup table. It should be apparent to a person skilled in the art that one of more of the above mentioned tasks can be are accomplished without any human intervention.

In one embodiment, an agent, which can be activated on the system, may be configured to automatically perform one of more of the above mentioned tasks. The agent may be a software agent installed on the system, which may be configured to interface with the operating system and on execution of the software, is capable of performing the above mentioned tasks without any human intervention. In a further embodiment, the agent is configured to interface with the software, i.e., the script, and in execution of the script perform the above mentioned tasks without any human intervention. It should also be apparent to a person skilled in the art that one or more of these tasks can be performed by a combination of user interaction and without any human intervention.

In one embodiment, the lookup table, containing parameters such as the event, e.g. window name, caption etc; action taken, response etc., is built into a repository. Every time an event occurs, the event may be recorded into the repository thereby building the repository with large amounts of data, thereby forming a repository with a relatively large historical database. Whenever an unexpected event occurs, the system is configured to check the repository and from the repository select the most obvious actions taken. The repository may contain rules to build the repository and also intelligence such as artificial intelligence techniques, which allow the repository with learning capabilities, which may be advantageously used to provide the user with an action taken in response to the occurrence of an event.

Figure 2:
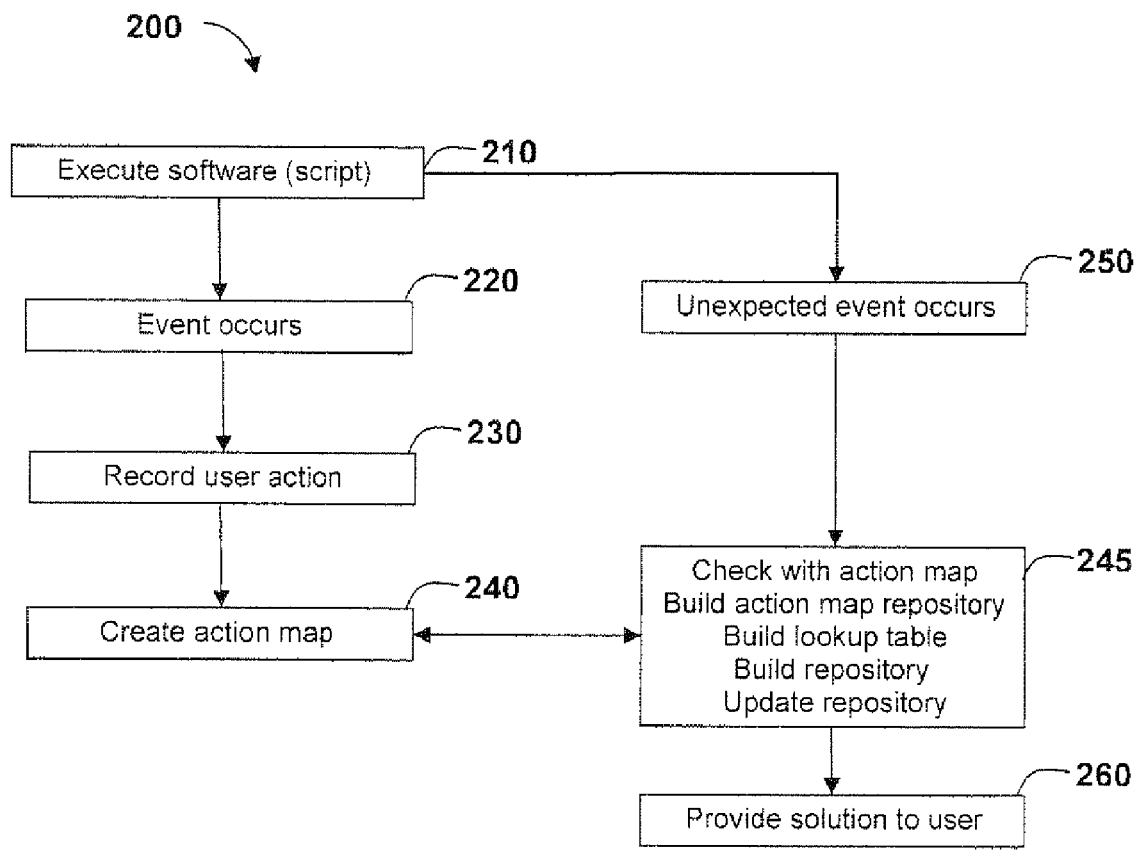
FIG. 2 illustrates an exemplary embodiment of a method 200 for recording and playback of actions associated with events occurring during execution of software in accordance with the present invention.

FIG. 2 illustrates an exemplary embodiment of a method 200 for recording and playback of actions associated with events occurring during execution of software. In 210, the software, preferably the scripts are executed, where the software typically contains a set instruction for performing one or more system requirements and generating a specified output. In 220, when the software is executed, an event occurs at a first instance and the event is recorded. Whenever an event occurs, in 230 a user performs an action which is associated with the event. In 240, the event that has occurred and the action taken by the user are recorded into an action map, which is a form of a lookup table, where the action map contains information such as the event, the action map, the response etc. This action map as described previously is preferably created as a lookup table and built as a repository to collect historical data.

During execution of the software, i.e playback, if an unexpected event occurs in 250, this unexpected event occurring at a next instance which is different from the first instance as in 220, control is transferred to 245, where the unexpected event is mapped with the previously recorded events in the action map, and the most obvious or commonly used action taken is selected. This is typically achieved by associating a respective response from the action map with the unexpected event. Once the action taken for the unexpected event can be determined in 245, the user is provided with a respective response in 260 which comprises the action taken for the unexpected event.

As discussed previously, one of more of the tasks performed of mapping the unexpected event, selecting the action taken, detecting occurrences of unexpected event, associating respective responses with unexpected events and providing users with the action taken are accomplished without any human intervention for example by means of an agent, and/or can be done partly by the user and/or partly by the agent or a combination thereof.

Typically the lookup table which is created is finally built into a historical repository and is undated on the occurrence of every event. The repository comprising rules as described previously, making the system intelligent and containing learning capabilities. The learning capabilities are configured for identifying and associating actions taken against an event in the repository and providing the user with the best solution available from the repository.

In summary, this invention consists of two part, first the recording phase and second the playback phase. During the execution/scripting/recording phase, the functional testing tool will maintain an action map such as "window name/ caption; Action; Response". As the user navigates through pages, the user can ask the action map to get populated, thereby creating the lookup table and building the historical repository. For example, if a browser page with "HTTP error not found" is detected, the user can add that page to the "action map", and then click on the "refresh" button, and the action associated with that page will be recorded. In a further case associated with any message related to remembering cookies, password saving prompts, etc. for any web based applications, and any conditional/error dialogs, etc. for other types of applications, the action map is populated. Noticeably, these events are not added to the core script, since these are typically error/edge conditions are not expected to be encountered every time.

During the second phase, playback, as the playback engine runs through the script, if during the playback an event that is not in the script is encountered, the engine first looks in the action map. If there is any match found in the action map, the associated action taken for such an event previously recorded in the action map is performed, a "warning" related to the same is added to the script and the execution of the script proceeds without any failure.

If an event is encountered that is not found in the script, and is also not in the action map a heuristics to do some default and common actions is performed depending on the type of event. These can be specified in a default action map, preferably predefined by the user, that can be global, or even something that is part of the core product, based on prior experiences and best practices. An ability for the script to pause can be provided, and the operator can be asked to perform some action which is recorded in the action map, and then continue execution of the script. A further option which is the is the simplest is to cause the script to fail.

The first option requires artificial intelligence capabilities to be built into the tool. Based on past responses to certain types of events, choice can be made on the most obvious or commonly used course of action. As the tool is used over and over for execution of the software, e.g. testing, debugging etc., the same application, the tool can learn from the responses and actions performed, and refine it's selection to perform the right task.

For the second option, automation of tools to detect between windows/events as just errors with the application under test (AUT), or as miscellaneous and unrelated error messages should be achieved. The tool will need to be enhanced to handle this. One mechanism would be for the tool to do some runtime checking of the windows/events that are generated, looking at properties such as parent process id to determine if they are related to the AUT or completely unexpected windows that need to be ignored or handled using the action map.

Advantageously such tools have benefits because the scripts are cleaner and more portable, since they are not dealing with intermittent event conditions that are part of a separate logic. A further advantage is that if the handling of unexpected windows/events was done through scripting, which would introduce a lot of redundant code, the unexpected windows/events can pop up in various places.

For those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention. The system depicted in FIG. 1 may be, for example, an IBM eServer pSeries system, a product of International Business Machines Corporation in Armonk, N.Y., running the Advanced Interactive Executive (AIX) operating system or LINUX operating system.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems, where such software may be advantageously executed.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A method for recording and playback of actions associated with events occurring during execution of a software processing tool, the method comprising:

processing a testing software, wherein the software comprises a set of instructions for performing one or more system requirements and generating an output;

recording an event at a first instance and an action taken in response by a user during execution of the testing software;

once the event and corresponding action taken are recorded, creating an action map of the recorded event and respective action taken in response to the event as recorded;

storing the action map; and during playback execution of the testing software, (i) detecting occurrences of an unexpected event at a next instance in the execution of the testing software;

(ii) associating one of the respective actions from the action map with the unexpected event; and (iii) providing to the user a response which comprises the corresponding action taken as recorded for the one respective action associated, from the action map, with the unexpected event wherein associating one of the respective actions from the action map with the unexpected event comprises:

mapping the unexpected event occurred at the next instance with a previously recorded event in the action map; and selecting most obvious or commonly used respective action taken in response to the previously recorded event.

2. The method of claim 1, wherein one or more of the steps of mapping the unexpected event, selecting the action taken, detecting occurrences of unexpected event, associating respective actions with unexpected events and providing to users the corresponding action taken as recorded are accomplished without any human intervention.

3. The method of claim 1, wherein the action map is a lookup table.

4. The method of claim 3, wherein the lookup table is a historical repository comprising rules.

5. The method of claim 4, wherein the rules comprise learning capabilities for identifying and associating actions taken against an event in the repository.

6. The method of claim 5, wherein identifying and associating action taken against an event is performed without any human intervention.

7. The method of claim 1 wherein the testing software includes any of functional testing and debugging.

8. The method of claim 1 wherein the testing software comprises one of test scripts and debug scripts.

9. A computer system comprising:

a processor; and a main memory, the processor and main memory coupled in a manner being capable of executing a software processing tool for recording and playback of actions associated with events occurring during execution of the software processing tool, and configured for:

processing a testing software, wherein the software comprises a set of instructions for performing one or more system requirements and generating an output;

recording an event at a first instance and an action taken in response by a user during execution of the testing software;

once the event and corresponding action taken are recorded, creating an action map of the recorded event and respective action taken in response to the event as recorded;

storing the action map; and during playback execution of the testing software, (i) detecting occurrences of an unexpected event at a next instance in the execution of the testing software;

(ii) associating one of the respective actions from the action map with the unexpected event; and (iii) providing to the user a response which comprises the corresponding action taken as recorded for the one respective action associated, from the action map, with the unexpected event wherein associating one of the respective actions from the action map with the unexpected event comprises:

mapping the unexpected event occurred at the next instance with a previously recorded event in the action map; and selecting most obvious or commonly used action taken.

10. The computer system of claim 9, wherein one or more of the steps of mapping the unexpected event, selecting the action taken, detecting occurrences of unexpected event, associating respective actions with unexpected events and providing to users the corresponding action taken as recorded are accomplished without any human intervention.

11. The computer system of claim 10, an agent is configured to perform the tasks of one or more of the steps of mapping the unexpected event, selecting the action taken, detecting occurrences of unexpected event, associating respective actions with unexpected events and providing to users the corresponding action taken.

12. The computer system of claim 9, wherein the action map is a lookup table.

13. The computer system of claim 12, wherein the lookup table is a historical repository comprising rules.

14. The computer system of claim 13, wherein the rules comprise learning capabilities for identifying and associating actions taken against an event in the repository.

15. The computer system of claim 14, wherein identifying and associating action taken against an event is performed without any human intervention.

16. A computer system as claimed in claim 9 wherein the testing software includes any of functional testing and debugging.

17. A computer system as claimed in claim 9 wherein the testing software comprises one of test scripts and debug scripts.

* * * * *